United States Patent
Byun et al.

(10) Patent No.: US 10,595,299 B2
(45) Date of Patent: Mar. 17, 2020

(54) METHOD AND DEVICE FOR ALTERING TRACKING AREA ON BASIS OF MOBILITY OF TERMINAL

(71) Applicant: LG Electronics Inc., Seoul (KR)

(72) Inventors: Daewook Byun, Seoul (KR); Jian Xu, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/316,243

(22) PCT Filed: Jul. 7, 2017

(86) PCT No.: PCT/KR2017/007311
§ 371 (c)(1),
(2) Date: Jan. 8, 2019

(87) PCT Pub. No.: WO2018/009030
PCT Pub. Date: Jan. 11, 2018

(65) Prior Publication Data
US 2019/0261314 A1    Aug. 22, 2019

Related U.S. Application Data

(60) Provisional application No. 62/359,778, filed on Jul. 8, 2016.

(51) Int. Cl.
*H04W 68/06* (2009.01)
*H04W 8/08* (2009.01)
(Continued)

(52) U.S. Cl.
CPC ............. *H04W 68/06* (2013.01); *H04W 8/08* (2013.01); *H04W 8/085* (2013.01); *H04W 8/10* (2013.01); *H04W 68/08* (2013.01)

(58) Field of Classification Search
CPC ....... H04W 68/06; H04W 68/08; H04W 8/08; H04W 8/085; H04W 8/10
See application file for complete search history.

(56) References Cited

U.S. PATENT DOCUMENTS 9,877,204 B1 *    1/2018  Vivanco ............... H04W 16/18
2008/0220782 A1 *  9/2008  Wang .................... H04W 4/08
                                                            455/436
(Continued)

FOREIGN PATENT DOCUMENTS

| EP | 2530981 | 12/2012 |
| KR | 10-1444434 | 9/2014 |
| WO | 2008/112161 | 9/2008 |

OTHER PUBLICATIONS

EP Supplementary Search Report in European Application No. EP 17824586, dated Dec. 17, 2019, 9 pages.
(Continued)

*Primary Examiner* — Khai M Nguyen
(74) *Attorney, Agent, or Firm* — Fish & Richardson P.C.

(57) ABSTRACT

Provided are a method by which an access and mobility function (AMF) in a wireless communication system selectively alters a tracking area set, and a device supporting the method. The method may comprise the steps of: receiving a plurality of tracking area sets from a base station; receiving, from the base station, information about the mobility of a terminal; and selecting any one tracking area set that corresponds to the received terminal mobility information.

12 Claims, 11 Drawing Sheets

(51) Int. Cl.
*H04W 8/10* (2009.01)
*H04W 68/08* (2009.01)

(56) References Cited

U.S. PATENT DOCUMENTS

| | | |
|---|---|---|
| 2011/0098051 A1 | 4/2011 | Kamalaraj et al. |
| 2013/0157658 A1* | 6/2013 | Kamalaraj ............ H04W 24/00 455/435.1 |
| 2014/0024377 A1 | 1/2014 | Bergqvist et al. |
| 2015/0215895 A1* | 7/2015 | Iwai ...................... H04W 68/04 455/458 |

OTHER PUBLICATIONS

LG Electronics, "New solution "Two layers Tracking Area handling for CIoT"", S2-152783, SA WG2 Meeting S2#110AH, Aug. 31-Sep. 3, 2015, Sophia Antipolis, France, 4 pages.

Lucent Technologies, "Hierarchical tracking Areas in the evolved system", S2H060307, 3GPP TSG SA WG2 Architecture—S2#SAEAdHoc, Apr. 3-6, 2006, Paris, France, 3 pages.

* cited by examiner

METHOD AND DEVICE FOR ALTERING TRACKING AREA ON BASIS OF MOBILITY OF TERMINAL

CROSS-REFERENCE TO RELATED APPLICATIONS

This application is the National Stage filing under 35 U.S.C. 371 of International Application No. PCT/KR2017/007311, filed on Jul. 7, 2017, which claims the benefit of U.S. Provisional Application No. 62/359,778, filed on Jul. 8, 2016, the contents of which are all hereby incorporated by reference herein in their entirety.

BACKGROUND OF THE INVENTION

Field of the Invention

The present invention relates to a wireless communication system and, more particularly, to a method for changing, by an access and mobility function (AMF), a tracking area according to the mobility of a user equipment to and a device supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

When a user equipment (UE) in idle mode moves out of a tracking area, the UE transmits a tracking area update (TAU) request message to a base station (BS), the BS delivers the TAU request message to a mobility management entity (MME), and the MME updates the tracking area of the UE. Accordingly, when a data packet to be transmitted to the UE in idle mode reaches a serving gateway (S-GW) via a packet gateway (P-GW) over the Internet, the S-GW requests the MME to transmit a paging message, and the MME requests all BSs in the tracking area of the UE to transmit a paging message. The BSs that are requested to transmit a paging message may wirelessly transmit a paging message, thereby finding the UE.

SUMMARY OF THE INVENTION

In existing LTE, the number of cells in a tracking area is fixed. However, the number of cells in a tracking area may need to be changed according to the mobility of a user equipment (UE). For example, when a UE moves fast, the number of cells in a tracking area needs to be increased in order to quickly find the UE. When a UE moves slowly, the number of cells in a tracking area needs to be reduced in order to reduce signaling for paging. Therefore, a method for changing a tracking area according to the mobility of a UE needs to be proposed in order to efficiently track a UE.

According to one embodiment, there is provided a method for selectively changing, by an access and mobility function (AMF), a tracking area set in a wireless communication system. The method may include: receiving a plurality of tracking area sets from a base station (BS); receiving information on mobility of a UE from the BS; and selecting any one tracking area set corresponding to the received information on the mobility of the UE.

The plurality of tracking area sets may be configured by the BS based on the mobility of the UE. The information on the mobility of the UE may be a speed of the UE.

The tracking area set may be configured as a small tracking area for a UE having low mobility and may be configured as a large tracking area for a UE having high mobility. When the UE has low mobility, the tracking area set configured as the small tracking area may be selected. When the UE has high mobility, the tracking area set configured as the large tracking area may be selected.

The plurality of tracking area sets may be received from the BS when an interface between the BS and the AMF is set up.

The information on the mobility of the UE may be received from the BS when a UE-associated connection is established between the BS and the AMF. The information on the mobility of the UE may be received from the BS when context of the UE is released. The information on the mobility of the UE may be received from the BS when a handover is performed through the AMF.

The method may further include receiving information on changed mobility of the UE from the BS. The method may further include changing the selected tracking area set to any one tracking area set corresponding to the changed mobility of the UE.

The method may further include reconfiguring the tracking area set based on the plurality of received tracking area sets. Any one tracking area set corresponding to the received information on the mobility of the UE may be selected from among the tracking area set reconfigured by the AMF.

According to another embodiment, there is provided a method for selectively changing, by a BS, a tracking area set in a wireless communication system. The method may include: configuring a plurality of tracking area sets; determining mobility of a UE; selecting a tracking area set corresponding to the determined mobility of the UE; and providing the selected tracking area set to an AMF.

The size of a tracking area may be selectively changed according to the mobility of a UE.

DESCRIPTION OF EXEMPLARY
EMBODIMENTS

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA-2000. The TDMA may be implemented with a radio technology such as global system for mobile communications (GSM)/general packet ratio service (GPRS)/enhanced data rate for GSM evolution (EDGE). The OFDMA may be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
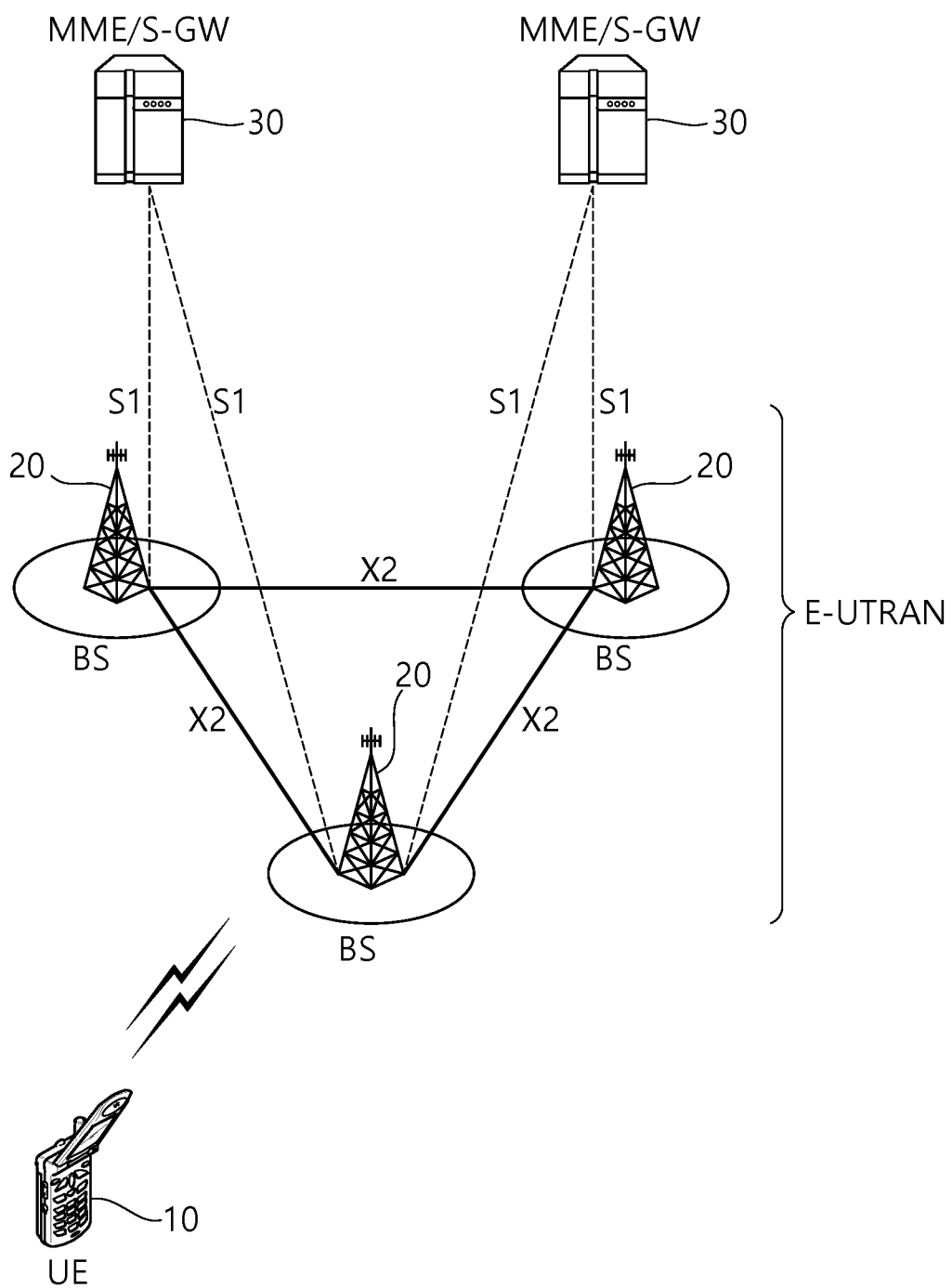
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells may be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighbor eNBs may have a meshed network structure that has the X2 interface. The eNBs 20 are connected to the EPC by means of an S1 interface. The eNBs 20 are connected to the MME by means of an S1-MME interface, and are connected to the S-GW by means of S1-U interface. The S1 interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
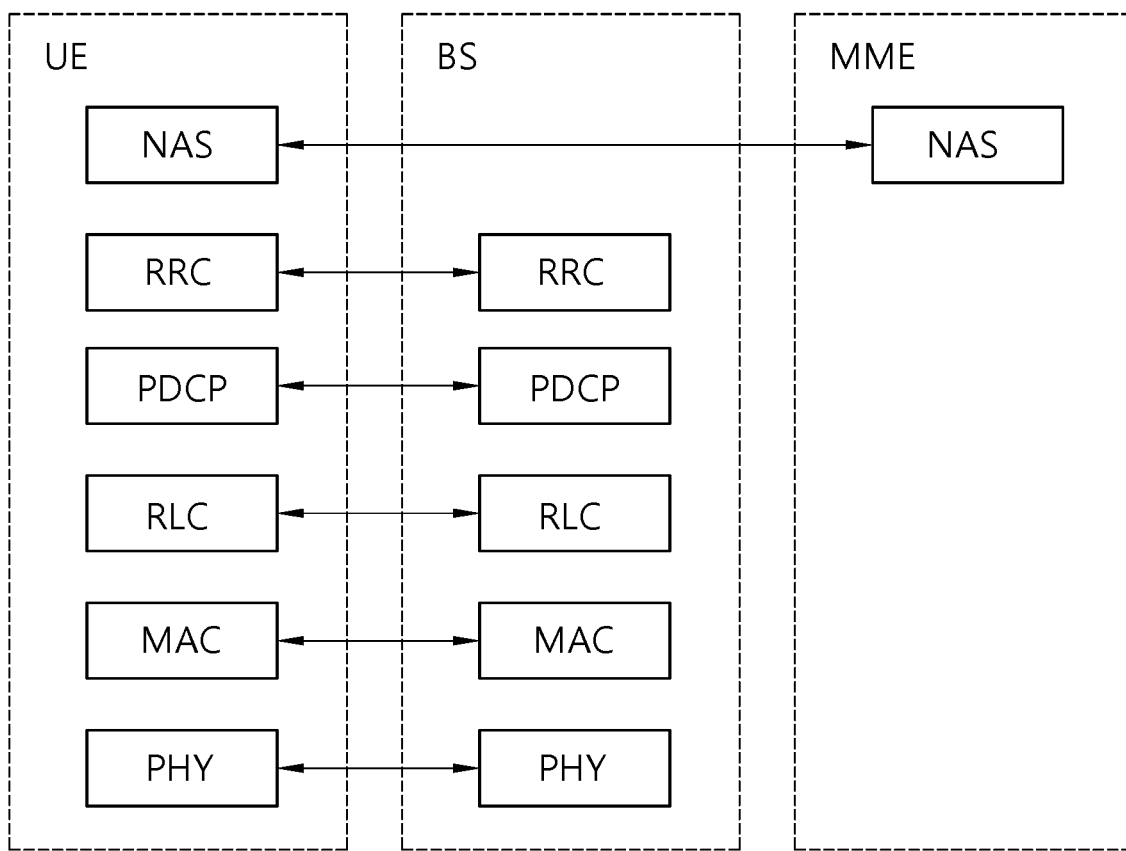
FIG. 2 shows a control plane of a radio interface protocol of an LTE system.
Figure 3:
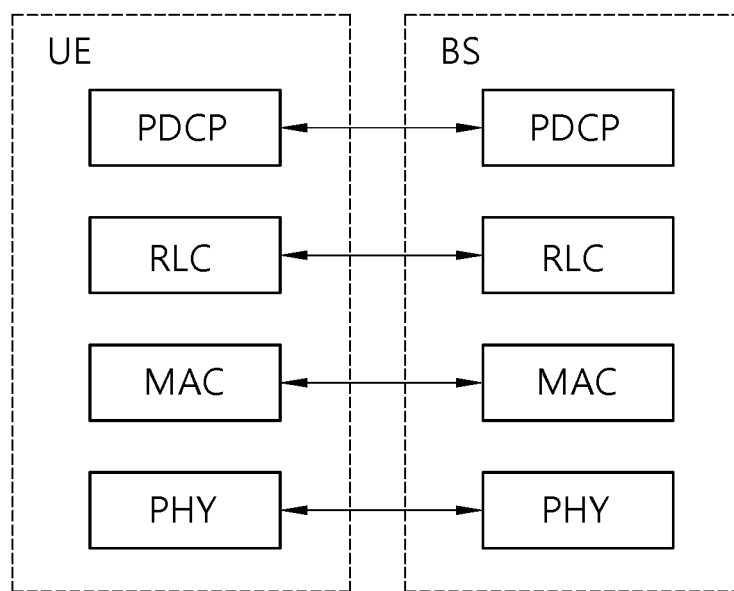
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data is transferred between the MAC layer and the PHY layer through the transport channel. Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and may exist in both uplink and downlink. The MTCH is a point-to-multipoint downlink channel for transmitting traffic data from the network to the UE.

Uplink connections between logical channels and transport channels include the DCCH that may be mapped to the UL-SCH, the DTCH that may be mapped to the UL-SCH and the CCCH that may be mapped to the UL-SCH. Downlink connections between logical channels and transport channels include the BCCH that may be mapped to the BCH or DL-SCH, the PCCH that may be mapped to the PCH, the DCCH that may be mapped to the DL-SCH, and the DTCH that may be mapped to the DL-SCH, the MCCH that may be mapped to the MCH, and the MTCH that may be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, may be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARM). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, An RRC state of a UE and RRC connection procedure are described.

An RRC state indicates whether an RRC layer of the UE is logically connected to an RRC layer of the E-UTRAN. The RRC state may be divided into two different states such as an RRC connected state and an RRC idle state. When an RRC connection is established between the RRC layer of the UE and the RRC layer of the E-UTRAN, the UE is in RRC_CONNECTED, and otherwise the UE is in RRC_IDLE. Since the UE in RRC_CONNECTED has the RRC connection established with the E-UTRAN, the E-UTRAN may recognize the existence of the UE in RRC_CONNECTED and may effectively control the UE. Meanwhile, the UE in RRC_IDLE may not be recognized by the E-UTRAN, and a CN manages the UE in unit of a TA which is a larger area than a cell. That is, only the existence of the UE in RRC_IDLE is recognized in unit of a large area, and the UE must transition to RRC_CONNECTED to receive a typical mobile communication service such as voice or data communication.

In RRC_IDLE state, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE state, no RRC context is stored in the eNB.

In RRC_CONNECTED state, the UE has an E-UTRAN RRC connection and a context in the E-UTRAN, such that transmitting and/or receiving data to/from the eNB becomes possible. Also, the UE may report channel quality information and feedback information to the eNB. In RRC_CONNECTED state, the E-UTRAN knows the cell to which the UE belongs. Therefore, the network may transmit and/or receive data to/from UE, the network may control mobility (handover and inter-radio access technologies (RAT) cell change order to GSM EDGE radio access network (GERAN) with network assisted cell change (NACC)) of the UE, and the network may perform cell measurements for a neighbor cell.

In RRC_IDLE state, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion.

A paging message is transmitted over all cells belonging to the same tracking area. If the UE moves from one TA to another TA, the UE will send a tracking area update (TAU) message to the network to update its location.

When the user initially powers on the UE, the UE first searches for a proper cell and then remains in RRC_IDLE in the cell. When there is a need to establish an RRC connection, the UE which remains in RRC_IDLE establishes the RRC connection with the RRC of the E-UTRAN through an RRC connection procedure and then may transition to RRC_CONNECTED. The UE which remains in RRC_IDLE may need to establish the RRC connection with the E-UTRAN when uplink data transmission is necessary due to a user's call attempt or the like or when there is a need to transmit a response message upon receiving a paging message from the E-UTRAN.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Hereinafter, a 5G network structure is described.

Figure 4:
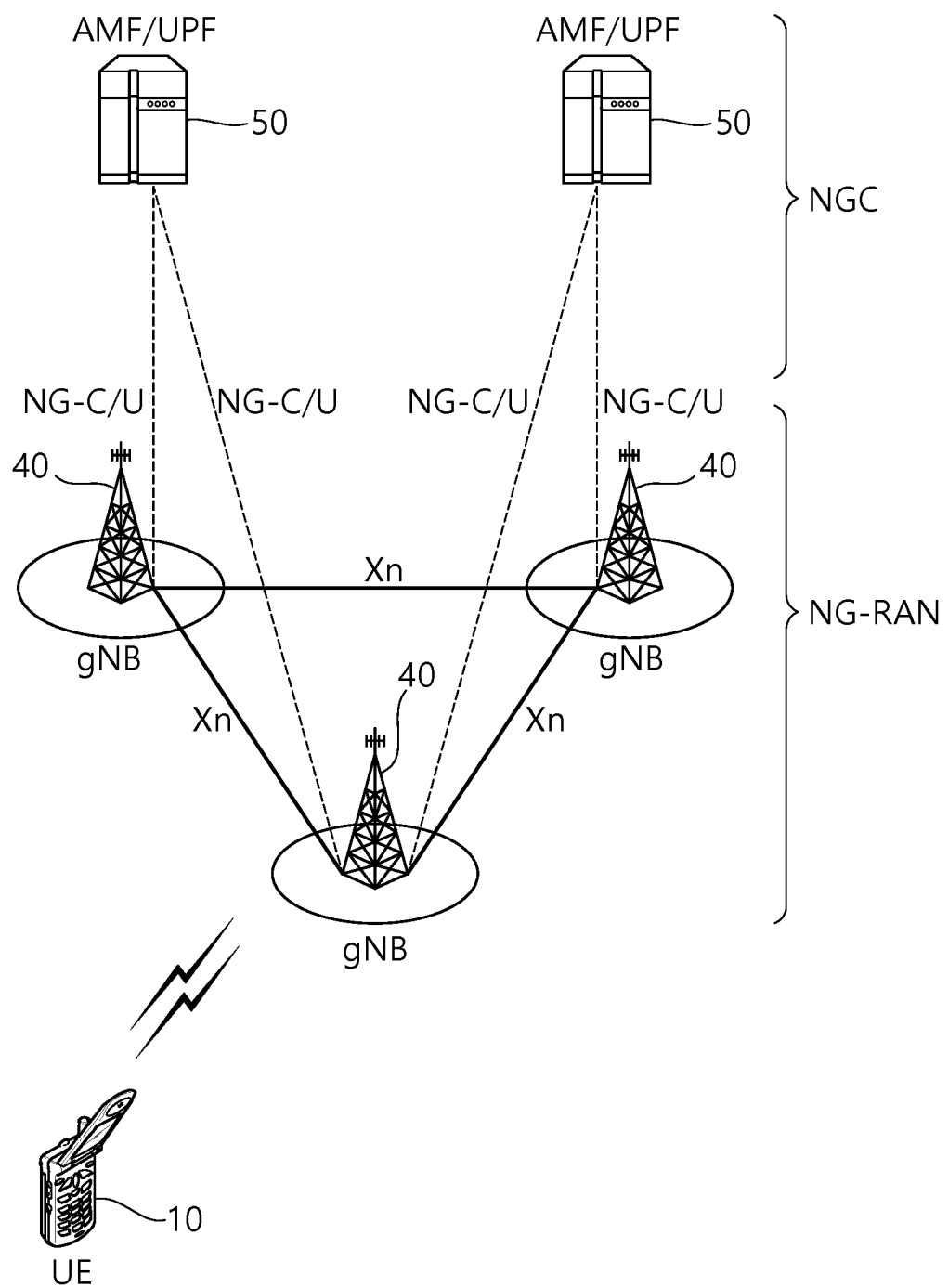
FIG. 4 shows a structure of a 5G system.

FIG. 4 shows a structure of a 5G system.

In case of an evolved packet core (EPC) having a core network structure of the existing evolved packet system (EPS), a function, a reference point, a protocol, or the like is defined for each entity such as a mobility management entity (MME), a serving gateway (S-GW), a packet data network gateway (P-GW), or the like.

On the other hand, in case of a 5G core network (or a NextGen core network), a function, a reference point, a protocol, or the like is defined for each network function (NF). That is, in the 5G core network, the function, the reference point, the protocol, or the like is not defined for each entity.

Referring to FIG. 4, the 5G system structure includes at least one UE 10, a next generation-radio access network (NG-RAN), and a next generation core (NGC).

The NG-RAN may include at least one gNB 40, and a plurality of UEs may be present in one cell. The gNB 40 provides the UE with end points of the control plane and the user plane. The gNB 40 is generally a fixed station that communicates with the UE 10 and may be referred to as another terminology, such as a base station (BS), a base transceiver system (BTS), an access point, or the like. One gNB 40 may be arranged in every cell. At least one cell may be present in a coverage of the gNB 40.

The NGC may include an access and mobility function (AMF) and a session management function (SMF) which are responsible for a function of a control plane. The AMF may be responsible for a mobility management function, and the SMF may be responsible for a session management function. The NGC may include a user plane function (UPF) which is responsible for a function of a user plane.

Interfaces for transmitting user traffic or control traffic may be used. The UE 10 and the gNB 40 may be connected by means of a Uu interface. The gNBs 40 may be interconnected by means of an X2 interface. Neighboring gNBs 40 may have a meshed network structure based on an Xn interface. The gNBs 40 may be connected to an NGC by means of an NG interface. The gNBs 40 may be connected to an AMF by means of an NG-C interface, and may be connected to a UPF by means of an NG-U interface. The NG interface supports a many-to-many-relation between the gNB 40 and the AMF/UPF 50.

A gNB host may perform functions such as functions for radio resource management, IP header compression and encryption of user data stream, selection of an AMF at UE attachment when no routing to an AMF can be determined from the information provided by the UE, routing of user plane data towards UPF(s), scheduling and transmission of paging messages (originated from the AMF), scheduling and transmission of system broadcast information (originated from the AMF or O&M), or measurement and measurement reporting configuration for mobility and scheduling.

An access and mobility function (AMF) host may perform primary functions such as NAS signalling termination, NAS signalling security, AS security control, inter CN node signalling for mobility between 3GPP access networks, idle mode UE reachability (including control and execution of paging retransmission), tracking area list management (for UE in idle and active mode), AMF selection for handovers with AMF change, access authentication, or access authorization including check of roaming rights.

A user plane function (UPF) host may perform primary functions such as anchor point for Intra-/inter-RAT mobility (when applicable), external PDU session point of interconnect to data network, packet routing & forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, UL/DL rate enforcement, uplink traffic verification (SDF to QoS flow mapping), transport level packet marking in the uplink and downlink, or downlink packet buffering and downlink data notification triggering.

A session management function (SMF) host may perform primary functions such as session management, UE IP address allocation and management, selection and control of UP function, configuring traffic steering at UPF to route traffic to proper destination, controlling part of policy enforcement and QoS, or downlink data notification.

In existing LTE, the number of cells in a tracking area is fixed in view of signaling and processing loads for paging transmission on an MME. However, the number of cells in a tracking area may need to be changed according to the mobility of a UE. For example, when a UE moves fast, the number of cells in a tracking area needs to be increased in order to quickly find the UE. When a UE moves slowly, the number of cells in a tracking area needs to be reduced in order to reduce signaling for paging. Therefore, a method for changing a tracking area according to the mobility of a UE needs to be proposed in order to efficiently track a UE. Hereinafter, a method for selectively changing, by an AMF, a tracking area set (AMF) and a device supporting the same will be described in detail according to one embodiment of the present invention. For convenience of explanation, the following description will be made with reference to 5G (or new RAT), but the technical idea of the present invention is not limited thereto. In this specification, the common CP-functions for a core network instance may be conceptually the same as the AMF.

Figure 5:
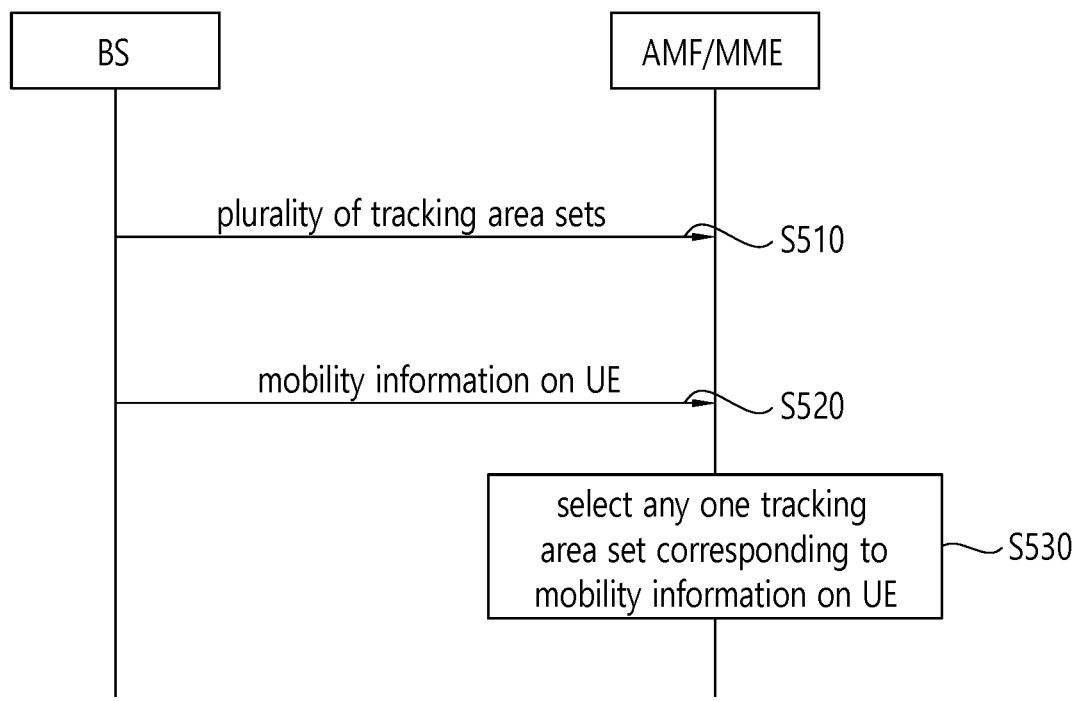
FIG. 5 illustrates a procedure in which an AMF determines a tracking area set according to one embodiment of the present invention.

FIG. 5 illustrates a procedure in which an AMF determines a tracking area set according to one embodiment of the present invention.

Referring to FIG. 5, in step S510, a BS may provide a plurality of tracking area sets to an AMF. All AMFs belonging to the same operator can support a plurality of tracking area sets. In this specification, a plurality of tracking area sets may also be referred to as a list of tracking areas. The plurality of tracking area sets may be provided to the AMF so that the AMF determines the size of a tracking area for a UE. The size of the tracking area may be the number of BSs in the tracking area or the number of cells in the tracking area.

The plurality of tracking area sets may be established by the BS based on the mobility level of the UE. The plurality of tracking area sets may be provided to the AMF when an interface between the BS and the AMF is set up. Each of the plurality of tracking area sets may have a different tracking area size according to the mobility level of the UE. Hereinafter, the plurality of tracking area sets will be described in detail with reference to FIG. 6.

Figure 6:
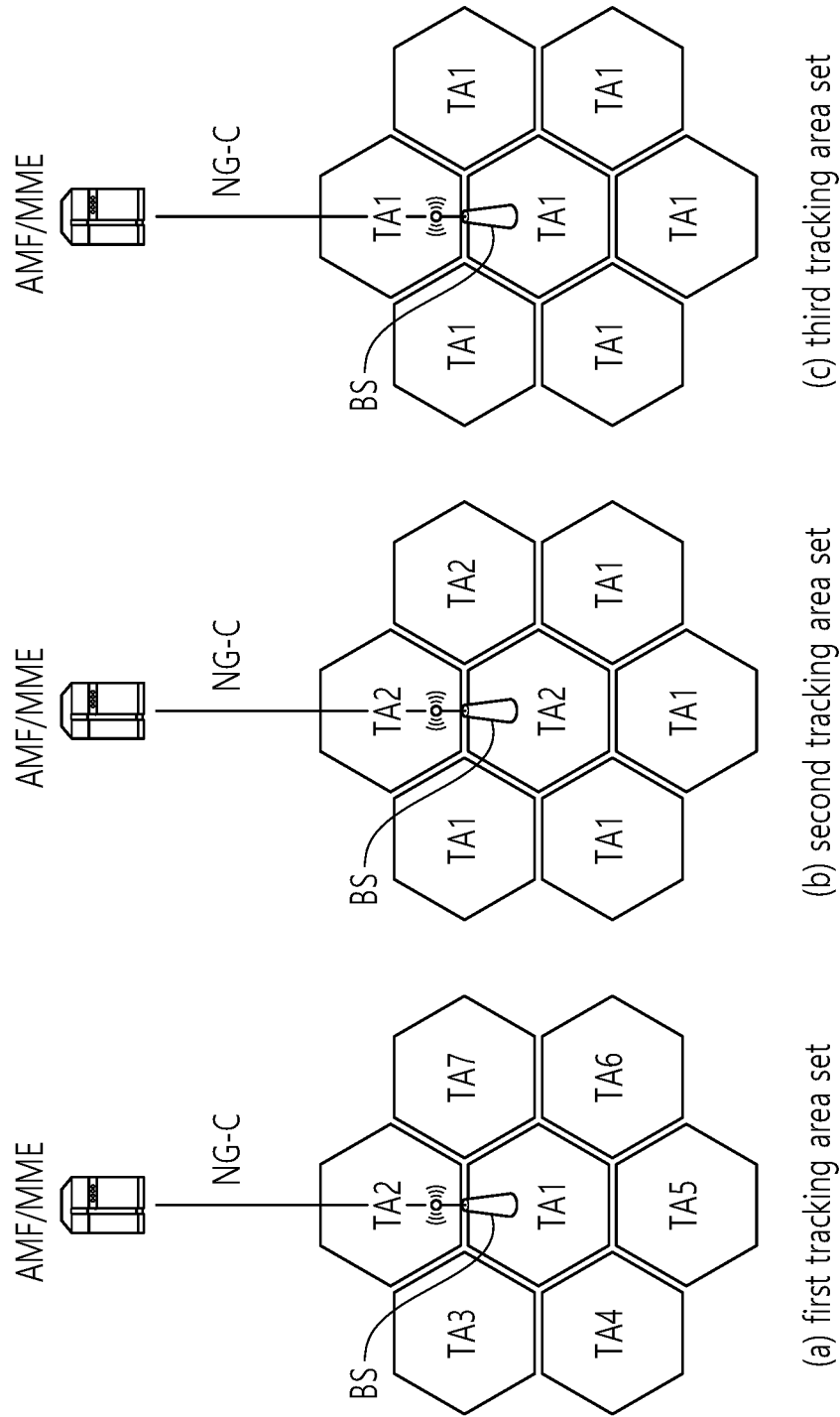
FIG. 6 illustrates an example of a plurality of tracking area sets configured based on the mobility level of a UE according to one embodiment of the present invention.

FIG. 6 illustrates an example of a plurality of tracking area sets configured based on the mobility level of a UE according to one embodiment of the present invention.

Referring to FIG. 6, a BS may set a plurality of tracking area sets based on the mobility level of a UE. For example, the plurality of tracking area sets may include a first tracking area set, a second tracking area set, and a third tracking area set. It is merely one example that the plurality of tracking area sets includes the three tracking areas, and the plurality of tracking area sets may include two or more of tracking area sets in the present invention. The first to third tracking area sets may have tracking areas of different sizes depending on the mobility level of a UE.

Referring to (a) of FIG. 6, the BS may set the first tracking area set for a UE having low mobility. For example, the first tracking area set may be set based on one cell in order to efficiently track a low-mobility UE. Specifically, the first tracking area set may include tracking area (TA) 1 to TA7. In the embodiment of FIG. 6, the first tracking area set may have tracking areas with the smallest size.

Referring to (b) of FIG. 6, the BS may set the second tracking area set for a UE having intermediate mobility. For example, the second tracking area set may be set based on a plurality of cells in order to efficiently track an intermediate-mobility UE. Specifically, the second tracking area set may include TA1 and TA2. In the embodiment of FIG. 6, the second tracking area set may have tracking areas with a medium size.

Referring to (c) of FIG. 6, the BS may set the third tracking area set for a UE with high mobility. For example, the third tracking area set may be set based on a BS in order to efficiently track a high-mobility UE. Specifically, the third tracking area set may include TA1.

According to the embodiment of FIG. 6, in step S510, the BS may provide the first tracking area set, the second tracking area set, and the third tracking area set, which are set based on the mobility level of the UE, to the AMF. The first tracking area set, the second tracking area set, and the third tracking area set provided to the AMF may be used by the AMF to determine the size of a tracking area for the UE.

Referring back to FIG. 5, in step S520, the BS may provide information on the mobile level of the UE to the AMF. The information on the mobility level of the UE may be, for example, speed information on the UE. The information on the mobility level of the UE may be, for example, an index generated based on the speed of the UE. When the index of the UE speed is defined in advance between the AMF and the BS, the BS may provide a specific index to the AMF, thereby notifying the AMF of the mobility level of the UE.

The information on the mobility level of the UE may be provided to the AMF when a UE-associated connection is established between the BS and the AMF. The information on the mobility level of the UE may be provided to the AMF when UE context is released. The information on the mobility level of the UE may be provided to the AMF when a handover is performed between BSs. The information on the mobility level of the UE may be provided to the AMF when a handover is performed through the AMF. The information on the mobility level of the UE may be provided to the AMF in a new procedure related to the UE between the AMF and the BS.

In step S530, when the AMF receives the information on the mobility level of the UE from the BS, the AMF may determine a related tracking area set for the UE. For example, when the AMF receives information on a first UE having low mobility from the BS, the AMF may determine a tracking area for the first UE to be the first tracking area set in (a) of FIG. 6. For example, when the AMF receives information on a second UE having intermediate mobility from the BS, the AMF may determine a tracking area for the second UE to be the second tracking area set in (b) of FIG. 6. For example, when the AMF receives information on a third UE having high mobility from the BS, the AMF may determine a tracking area for the third UE to be the third tracking area set in (c) of FIG. 6.

According to the embodiment of the present invention, the AMF can support a plurality of tracking area sets and can selectively change the size of a tracking area according to the mobility level of a UE. Therefore, comparing to the conventional technique in which the size of a tracking area is fixed, the AMF can selectively apply the size of a tracking area to each UE and can efficiently track a UE.

Figure 7:
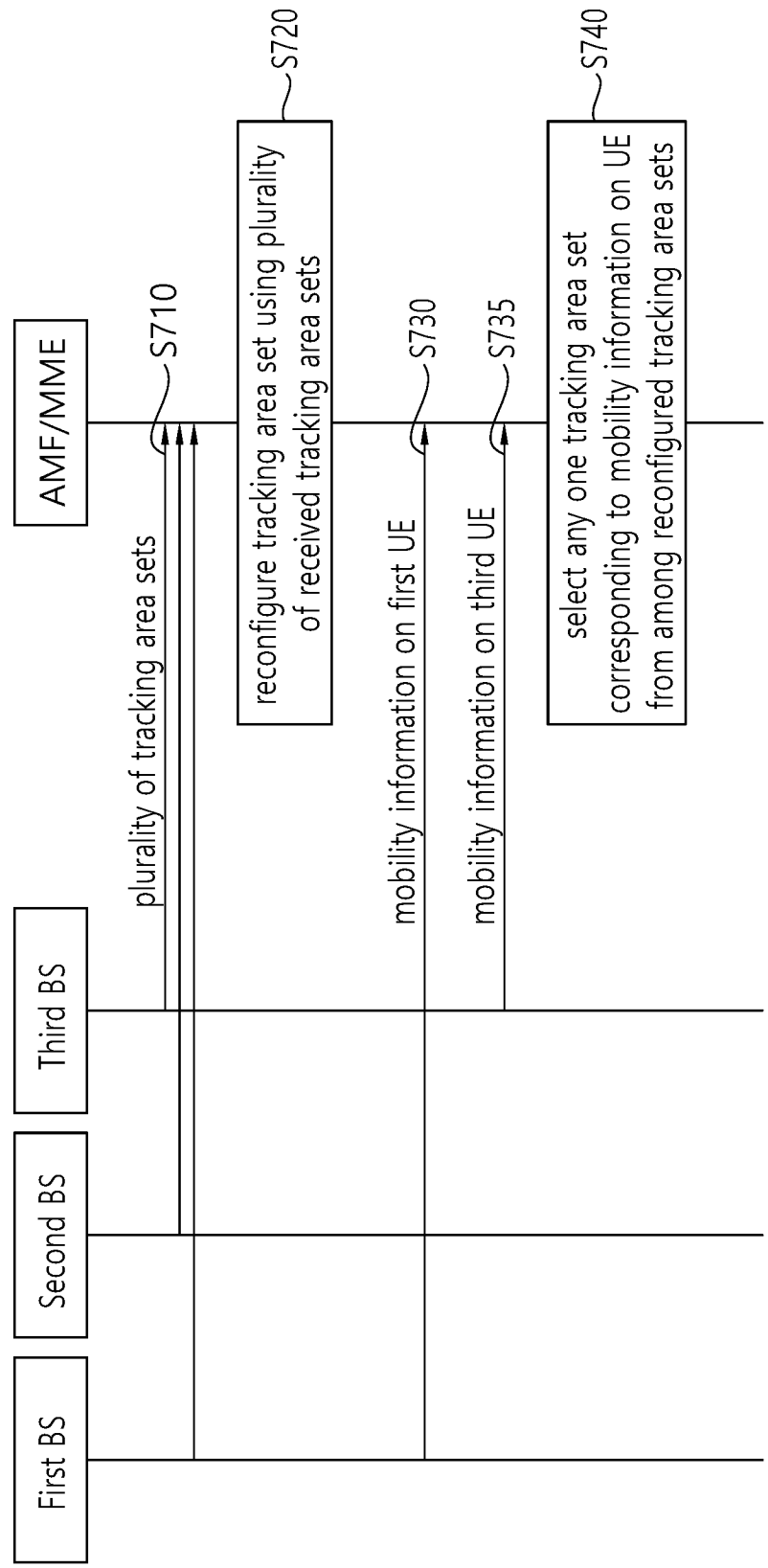
FIG. 7 illustrates a procedure in which an AMF determines a tracking area set according to one embodiment of the present invention.

FIG. 7 illustrates a procedure in which an AMF determines a tracking area set according to one embodiment of the present invention.

Referring to FIG. 7, in step S710, an AMF may receive a plurality of tracking area sets from a plurality of BSs. In the embodiment of FIG. 7, it is assumed that the plurality of BSs includes a first BS to a third BS. The plurality of tracking area sets may be provided to the AMF so that the AMF determines the size of a tracking area for a UE. The size of the tracking area may be the number of BSs in the tracking area or the number of cells in the tracking area.

The plurality of tracking area sets may be respectively established by the first to third BSs based on the mobility level of a UE. The plurality of tracking area sets may be provided to the AMF when an interface between the BSs and the AMF is set up. Each of the plurality of tracking area sets may have a different tracking area size depending on the mobility level of the UE. Hereinafter, the plurality of tracking area sets will be described in detail with reference to FIG. 8.

Figure 8:
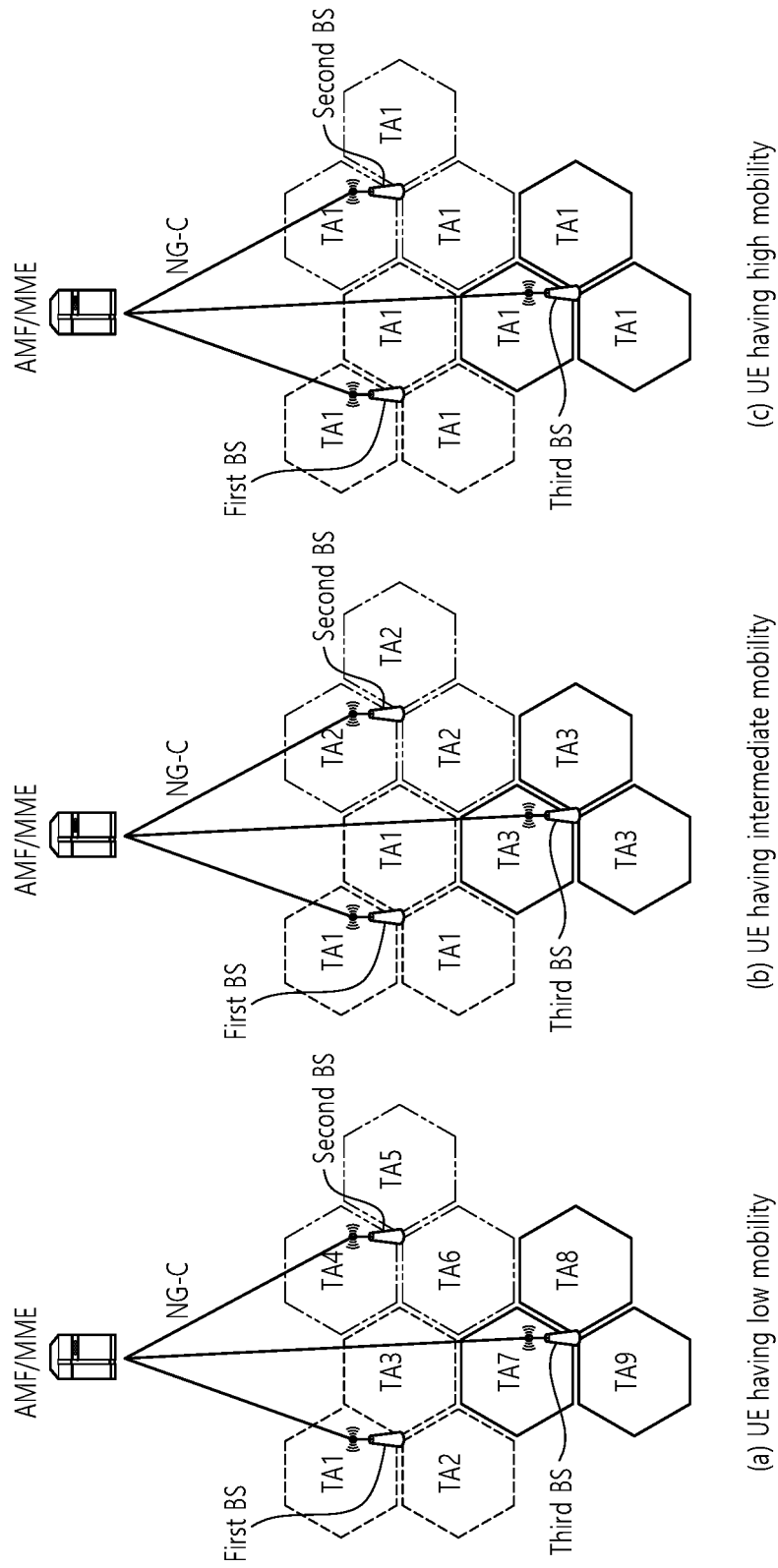
FIG. 8 illustrates an example of a plurality of tracking area sets configured based on the mobility level of a UE according to one embodiment of the present invention.

FIG. 8 illustrates an example of a plurality of tracking area sets configured based on the mobility level of a UE according to one embodiment of the present invention.

Referring to FIG. 8, the first to third BSs may set a plurality of tracking area sets based on the mobility level of a UE. The plurality of tracking area sets may have tracking areas of different sizes depending on the mobility level of a UE.

Referring to (a) of FIG. 8, the first to third BSs may set a tracking area set for a UE having low mobility based on a cell. The first to third BSs may report to the AMF that three tracking areas can be set in the BS for the UE having low mobility.

Referring to (b) of FIG. 8, the first to third BSs may set a tracking area for a UE having intermediate mobility based on a BS. The first to third BSs may report to the AMF that one tracking area can be set in the BS for the UE having intermediate mobility.

Referring to (c) of FIG. 8, the first to third BSs may set a tracking area for a UE with high mobility based on a BS. The first to third BSs may report to the AMF that one tracking area can be set in the BS for the UE having high mobility. That is, in the embodiment of FIG. 8, the first to third BSs may report to the AMF that one tracking area can be set in the BS for the UE having intermediate mobility and the UE having high mobility.

Referring back to FIG. 7, in step S720, the AMF may reset a tracking area set using the plurality of tracking area sets received from the plurality of BSs.

Referring back to FIG. 8, the AMF may set a tracking area set including nine tracking areas (e.g., TA1 to TA9) for a UE having low mobility. The AMF may set a tracking area set including three tracking areas (e.g., TA1 to TA3) for a UE having intermediate mobility. The AMF may set a tracking area set including one tracking area (e.g., TA1) for a UE having high mobility. That is, even though the first to third BSs provide the AMF with the same tracking area set for the UE having intermediate mobility and the UE having high mobility in step S710, the AMF may set different tracking area sets for the UE having intermediate mobility and the UE having high mobility based on the mobility level of the UE in step S720. That is, in step S720, the AMF may set a tracking area set including three tracking areas for a UE having intermediate mobility and may set a tracking area set including one tracking area for a UE having high mobility.

Referring back to FIG. 7, in step S730, the first BS may provide the AMF with information on the mobility level of a first UE belonging to the first BS. It is assumed that the first UE is a terminal having high mobility. Also, in step S735, the third BS may provide the AMF with information on the mobility level of a third UE belonging to the third BS. It is assumed that the third UE is a terminal having intermediate mobility. Information on the mobility level of the UE may be, for example, speed information on the UE. The information on the mobility level of the UE may be, for example, an index generated based on the speed of the UE.

The information on the mobility level of the UE may be provided to the AMF when a UE-associated connection is established between the BS and the AMF. The information on the mobility level of the UE may be provided to the AMF when UE context is released. The information on the mobility level of the UE may be provided to the AMF when a handover is performed between BSs. The information on the mobility level of the UE may be provided to the AMF when a handover is performed through the AMF. The information on the mobility level of the UE may be provided to the AMF in a new procedure related to the UE between the AMF and the BS.

In step S740, when the AMF receives the information on the mobility level of the UE from the BS, the AMF may determine a tracking area set for the UE among the plurality of tracking area sets reset in step S720. For example, the AMF may determine a tracking area for the first UE to be the tracking area set in (c) of FIG. 8. For example, the AMF may determine a tracking area for the third UE to be the tracking area set in (b) of FIG. 8.

According to the embodiment of the present invention, the AMF can reset a plurality of new tracking area sets based on a plurality of tracking area sets received from a plurality of BSs. Furthermore, the AMF can selectively change a tracking area set for a UE among the plurality of reset tracking area sets depending on the mobility level of the UE. Therefore, comparing to the conventional technique in which the size of a tracking area is fixed, the AMF can efficiently track a UE.

Figure 9:
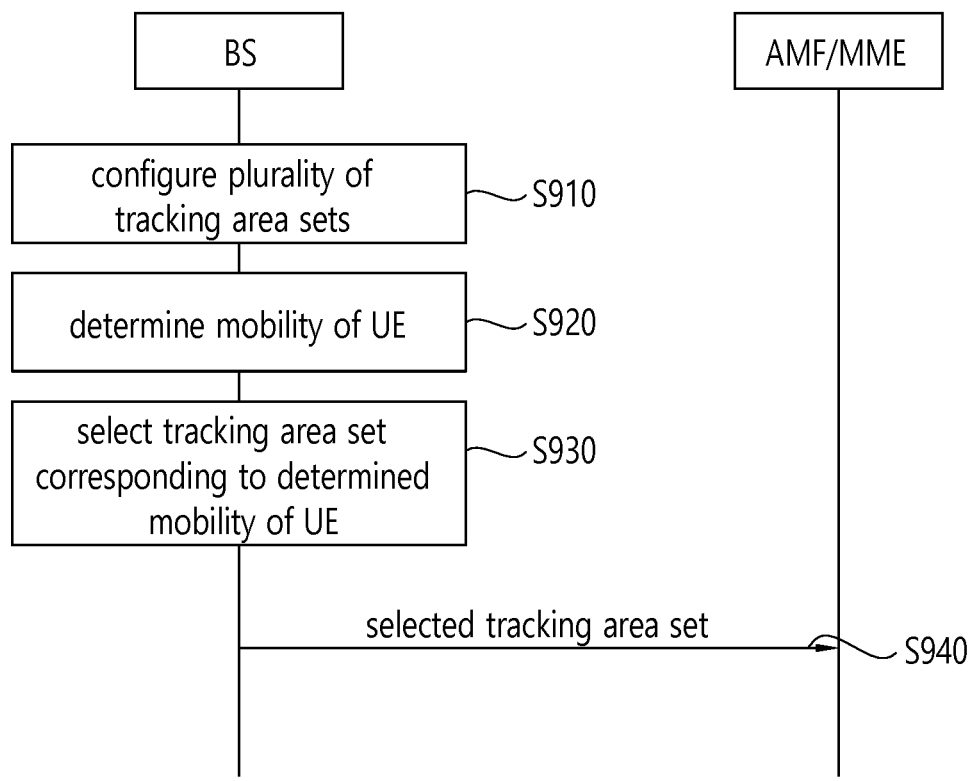
FIG. 9 illustrates a procedure in which a BS determines a tracking area set according to one embodiment of the present invention.

FIG. 9 illustrates a procedure in which a BS determines a tracking area set according to one embodiment of the present invention.

Referring to FIG. 9, in step S910, a BS may set a plurality of tracking area sets. The plurality of tracking area sets may be established by the BS based on the mobility level of a UE. Each of the plurality of tracking area sets may have a different tracking area size depending on the mobility level of the UE. The tracking area size may be the number of cells in a tracking area. For example, as in FIG. 6, the plurality of tracking area sets may include a first tracking area set, a second tracking area set, and a third tracking area set.

In step S920, the BS may determine the mobility level of a UE. For example, the mobility level of the UE may be the speed of the UE.

In step S930, the BS may select a tracking area set corresponding to the determined mobility level of the UE. For example, when the determined mobility level of the UE corresponds to low mobility, the BS may select the first tracking area set shown in (a) of FIG. 6. For example, when the determined mobility level of the UE corresponds to intermediate mobility, the BS may select the second tracking area set shown in (b) of FIG. 6. For example, when the determined mobility level of the UE corresponds to high mobility, the BS may select the third tracking area set shown in (c) of FIG. 6.

In step S940, the BS may provide the selected tracking area set to an AMF. The selected tracking area set may be provided to the AMF when a UE-associated connection is established between the BS and the AMF. The selected tracking area set may be provided to the AMF when UE context is released. The selected tracking area set may be provided to the AMF when a handover is performed between BSs. The selected tracking area set may be provided to the AMF when a handover is performed through the AMF. The selected tracking area set may be provided to the AMF in a new procedure related to the UE between the AMF and the BS.

According to the embodiment of the present invention, the AMF can support a plurality of tracking area sets, and the BS can selectively change the size of a tracking area according to the mobility level of a UE. Therefore, comparing to the conventional technique in which the size of a tracking area is fixed, the AMF can efficiently track a UE.

Figure 10:
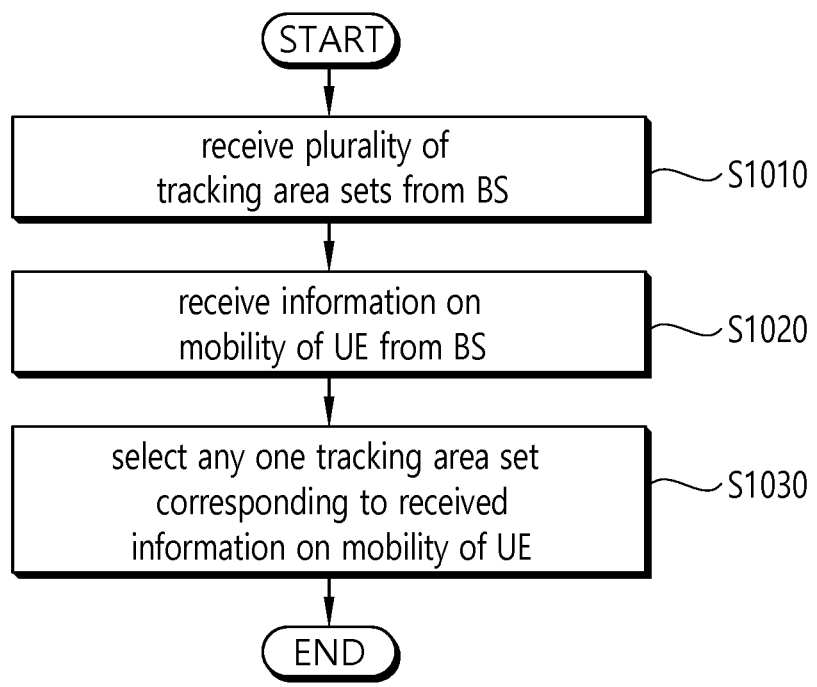
FIG. 10 is a block diagram illustrating a method in which an AMF selectively changes a tracking area set according to one embodiment of the present invention.

FIG. 10 is a block diagram illustrating a method in which an AMF selectively changes a tracking area set according to one embodiment of the present invention.

Referring to FIG. 10, in step S1010, an AMF may receive a plurality of tracking area sets from a BS. The plurality of tracking area sets may be configured by the BS based on the mobility of a UE. Information on the mobility of the UE may be the speed of the UE. The tracking area set may be configured as a small tracking area for a UE having low mobility and may be configured as a large tracking area for a UE having high mobility. The plurality of tracking area sets may be received from the BS when an interface between the BS and the AMF is setup.

In step S1020, the AMF may receive the information on the mobility of the UE from the BS. The information on the mobility of the UE may be received from the BS when a UE-associated connection is established between the BS and the AMF. The information on the mobility of the UE may be received from the BS when the context of the UE is released. The information on the mobility of the UE may be received from the BS when a handover is performed through the AMF.

In step S1030, the AMF may select any one tracking area set corresponding to the received information on the mobility of the UE. When the UE has low mobility, a tracking area set configured as a small tracking area may be selected. When the UE has high mobility, a tracking area set configured as a large tracking area may be selected.

In addition, the AMF may receive information on the changed mobility of the UE from the BS. The AMF may change the selected tracking area set to any one tracking area set corresponding to the changed mobility of the UE.

Further, the AMF may reset the tracking area set based on the plurality of received tracking area sets. In this case, any one tracking area set corresponding to the received information on the mobility of the UE may be selected from among the tracking area sets reconfigured by the AMF.

Figure 11:
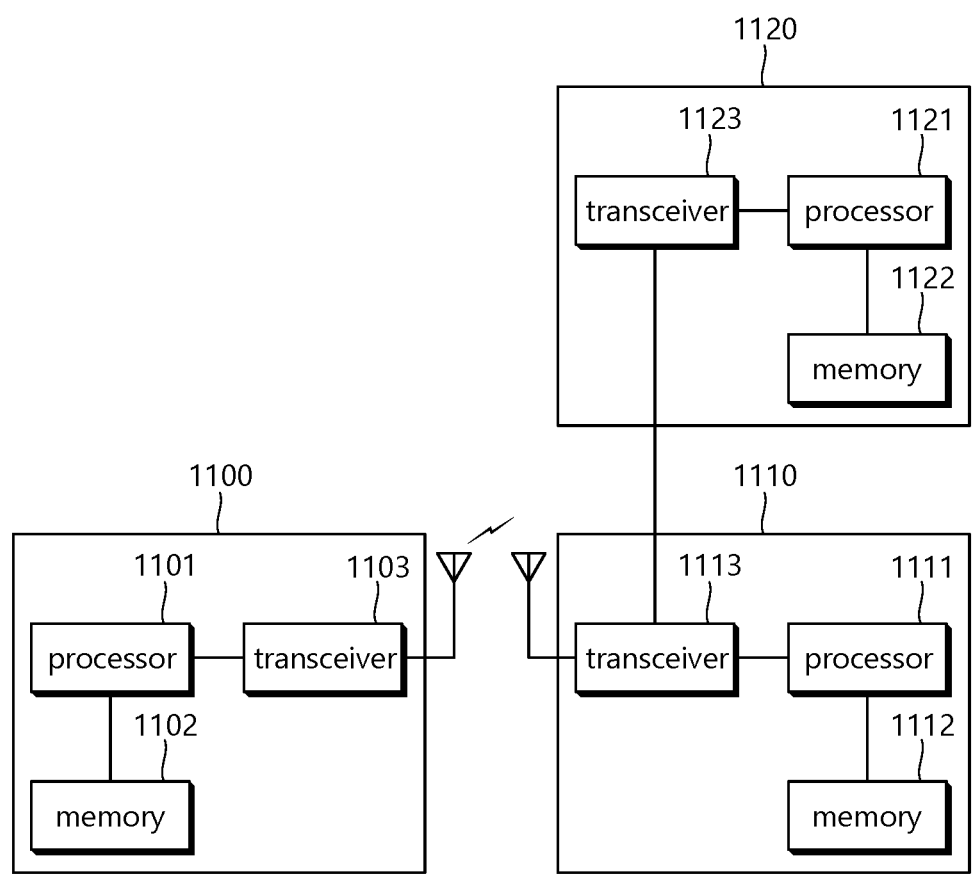
FIG. 11 is a block diagram illustrating a wireless communication system according to the embodiment of the present invention.

FIG. 11 is a block diagram illustrating a wireless communication system according to the embodiment of the present invention.

A UE 1100 includes a processor 1101, a memory 1102 and a transceiver 1103. The memory 1102 is connected to the processor 1101, and stores various information for driving the processor 1101. The transceiver 1103 is connected to the processor 1101, and transmits and/or receives radio signals. The processor 1101 implements proposed functions, processes and/or methods. In the above embodiment, an operation of the UE may be implemented by the processor 1101.

A BS 1110 includes a processor 1111, a memory 1112 and a transceiver 1113. The memory 1112 is connected to the processor 1111, and stores various types of information for driving the processor 1111. The transceiver 1113 is connected to the processor 1111, and transmits and/or receives radio signals. The processor 1111 implements proposed functions, processes and/or methods. In the above embodiment, an operation of the BS may be implemented by the processor 1111.

A MME/AMF 1120 includes a processor 1121, a memory 1122 and a transceiver 1123. The memory 1122 is connected to the processor 1121, and stores various types of information for driving the processor 1121. The transceiver 1123 is connected to the processor 1121, and transmits and/or receives radio signals. The processor 1121 implements proposed functions, processes and/or methods. In the above embodiment, an operation of the MME/AMF may be implemented by the processor 1121.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for selectively changing, by an access and mobility function (AMF), a tracking area set in a wireless communication system, the method comprising:
   receiving a plurality of first tracking area sets from a plurality of base stations;
   receiving information on mobility of a user equipment (UE) from the plurality of base stations;
   reconfiguring a plurality of second tracking area sets based on the plurality of first tracking area sets; and
   selecting a second tracking area set from among the plurality of second tracking area sets corresponding to the received information on the mobility of the UE.

2. The method of claim 1, wherein the plurality of first tracking area sets is configured by the BS based on the mobility of the UE.

3. The method of claim 2, wherein the information on the mobility of the UE is a speed of the UE.

4. The method of claim 2, wherein the second tracking area set is configured as a small tracking area for a UE having low mobility and is configured as a large tracking area for a UE having high mobility.

5. The method of claim 4, wherein when the UE has low mobility, the second tracking area set configured as the small tracking area is selected.

6. The method of claim 4, wherein when the UE has high mobility, the second tracking area set configured as the large tracking area is selected.

7. The method of claim 1, wherein the plurality of first tracking area sets is received from the plurality of base stations when an interface between the plurality of base stations and the AMF is set up.

8. The method of claim 1, wherein the information on the mobility of the UE is received from the plurality of base stations when a UE-associated connection is established between the BS and the AMF.

9. The method of claim 1, wherein the information on the mobility of the UE is received from the plurality of base stations when context of the UE is released.

10. The method of claim 1, wherein the information on the mobility of the UE is received from the plurality of base stations when a handover is performed through the AMF.

11. The method of claim 1, further comprising:
receiving information on changed mobility of the UE from the plurality of base stations.

12. The method of claim 11, further comprising:
changing the second tracking area set to another second tracking area set from among the plurality of second tracking area sets corresponding to the changed mobility of the UE.

* * * * *